(12) United States Patent
Jean et al.

(10) Patent No.: US 9,780,561 B2
(45) Date of Patent: Oct. 3, 2017

(54) SOLAR ENERGY GENERATION SYSTEM, MEASUREMENT MODULE AND POSITIONING METHOD

(71) Applicant: AU Optronics Corporation, Hsin-Chu (TW)

(72) Inventors: Yuan-Bor Jean, Hsin-Chu (TW); Yi-Ming Huang, Hsin-Chu (TW); Min-Chien Kuo, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 468 days.

(21) Appl. No.: 14/176,302

(22) Filed: Feb. 10, 2014

(65) Prior Publication Data

US 2015/0028682 A1    Jan. 29, 2015

(30) Foreign Application Priority Data

Jul. 24, 2013   (CN) .......................... 2013 1 0314080

(51) Int. Cl.
*H02J 1/00* (2006.01)
*H02J 3/00* (2006.01)
*H02S 50/00* (2014.01)

(52) U.S. Cl.
CPC ................ *H02J 1/00* (2013.01); *H02S 50/00* (2013.01); *Y10T 307/696* (2015.04)

(58) Field of Classification Search
CPC ......... H02J 1/00; H02S 50/00; Y10T 307/696
USPC .......................................................... 307/80
See application file for complete search history.

(56) References Cited

U.S. PATENT DOCUMENTS

| | | | |
|---|---|---|---|
| 8,103,465 B2 | 1/2012 | Brzezowski et al. | |
| 2010/0082171 A1 | 4/2010 | Takehara et al. | |
| 2011/0115295 A1* | 5/2011 | Moon | H02J 3/32 |
| | | | 307/65 |
| 2011/0291486 A1 | 12/2011 | Adest et al. | |
| 2012/0043923 A1 | 2/2012 | Ikriannikov et al. | |
| 2012/0242321 A1 | 9/2012 | Kasai et al. | |

(Continued)

FOREIGN PATENT DOCUMENTS

| | | |
|---|---|---|
| CN | 201413353 | 2/2010 |
| CN | 102437793 | 5/2012 |
| CN | 102608493 | 7/2012 |

(Continued)

OTHER PUBLICATIONS

China Patent Office, "Office Action", Feb. 9, 2015.

*Primary Examiner* — Rexford Barnie
*Assistant Examiner* — Toan Vu
(74) *Attorney, Agent, or Firm* — WPAT, PC

(57) ABSTRACT

A solar energy generation system a measurement module and a positioning method are disclosed herein. The positioning method is adaptable to a power generation system having AC generation modules. Each of the AC generation modules generates an output current and is electrically connected to each other in a power-supply network. The positioning method includes the following operations: (a) measuring AC currents or node voltages generated by the AC generation modules at different positions in the power-supply network to obtain current parameters or voltage parameters; and (b) determining a sequence of relative positions of the AC generation modules by calculating the current parameters or the voltage parameters.

15 Claims, 7 Drawing Sheets

(56) References Cited

U.S. PATENT DOCUMENTS

2013/0015875 A1    1/2013  Kumar
2014/0118014 A1*   5/2014  Orr ........................ G01R 27/16
                                                              324/713

FOREIGN PATENT DOCUMENTS

| CN | 102623973   | 8/2012 |
| CN | 102630348   | 8/2012 |
| CN | 202870234   | 4/2013 |
| KR | 20110105258 | 9/2011 |
| TW | 201223075   | 6/2012 |
| WO | 2011004336  | 1/2011 |
| WO | 2013010083  | 1/2013 |

* cited by examiner

US 9,780,561 B2

SOLAR ENERGY GENERATION SYSTEM, MEASUREMENT MODULE AND POSITIONING METHOD

RELATED APPLICATIONS

This application claims priority to Chinese Application Serial Number 201310314080.3, filed Jul. 24, 2013, which is herein incorporated by reference.

BACKGROUND

Field of Invention

The present invention relates to a solar energy generation system. More particularly, the present invention relates to a measurement module in the solar energy generation system and a positioning method thereof.

Description of Related Art

With the rapid decrease of worldwide crude oil reserves, issues regarding development of renewable energies have attracted more and more attentions. Currently, one feasible form of alternative energy is solar energy. Power generation systems to convert solar energies into electrical energies with solar panels have been widely utilized in many countries.

The so-called online solar energy system with alternating-current modules refers to a solar energy generation system having alternating current (AC) generation modules connected together. Each of the AC generation modules includes a solar panel and a micro-inverter (μ-inverter). The solar panels in a solar energy generation system convert solar energies into direct current (DC) energies, and the DC electricity produced by the solar panels is then converted by the micro-inverters to AC currents to be fed into the grid.

In practical applications, each of the AC generation modules needs to be monitored to ensure that all the AC generation modules operate normally and maintain a certain conversion efficiency. Even with such a requirement, only the overall power generation of a solar energy generation system is monitored in real-time in most of the current solar energy generation systems. If operating conditions for each AC generation module is required, a data collector being able to communicate with the micro-inverter needs to be installed so as to monitor the individual AC generation module based on power generation data transmitted from the micro-inverter. The micro-inverters may use different protocols. However, the development of universal data collectors shows a certain degree of difficulty and the development cost is high. Under the circumstances, the system installers choose to use micro-inverters supplied by a single vendor as possible. Moreover, since a micro-inverter only senses the current output by itself, each of the AC generation modules is positioned by manual recording. When the number of the AC generation modules is huge, the manual monitoring method is not efficient enough. Furthermore, the precision of sensor in the micro-inverter is not as good as an electric meter.

Therefore, a heretofore unaddressed need exists to address the aforementioned deficiencies and inadequacies.

SUMMARY

It is to be understood that both the foregoing general description and the following detailed description are by examples, and are intended to provide further explanation of the disclosure as claimed.

One aspect of the present disclosure provides a solar energy generation system. The solar energy generation system includes a monitoring module, AC generation modules, and measurement modules. Each of the AC generation modules generates an output current, and is electrically connected to each other in a power-supply network. The measurement modules are electrically connected to the AC generation modules respectively. Each of the measurement modules includes a first current sensor and a communication unit. The first current sensor is configured to detect an AC current passing through a position of each of the measurement modules at the power-supply network to generate a first current parameter. The communication unit is configured to transmit the first current parameter to the monitoring module. The monitoring module is configured to determine a sequence of relative positions of the AC generation modules by calculating the first current parameters transmitted from the measurement modules.

According to one embodiment of the present disclosure, each of the measurement modules includes a first breaker. The first break is coupled between the input terminal and the first current sensor.

According to one embodiment of the present disclosure, each of the measurement modules includes a second breaker. The second breaker is coupled between the output terminal and the first current sensor.

According to one embodiment of the present disclosure, the measurement modules further includes a voltage sensor and a control unit. The voltage sensor is configured to detect a voltage at the position of each of the measurement modules in the power-supply network to generate a voltage parameter. The control unit is configured to be controlled by the monitoring module to open the first breaker and the second breaker. The monitoring module sequentially opens the first breaker or the second breaker of each of the measurement modules by controlling the control unit, and determines the sequence of the relative positions of the AC generation modules by calculating the voltage parameters transmitted from the measurement modules.

Another aspect of the present disclosure provides a measurement module, which is able to be applied in the solar energy generation system. The measurement module has a first input terminal, a second input terminal, and an output terminal. The measurement module includes a first current sensor, a second current sensor, a voltage sensor, a control unit, a communication unit and a storage unit. The first current sensor is coupled between the first input terminal and the output terminal, and the first current sensor is configured to generate a first current parameter. The second current sensor is coupled between the second input terminal and the output terminal, and the second current sensor is configured to generate a second current parameter. The voltage sensor is configured to detect a voltage at the output terminal to generate a voltage parameter. The control unit is configured to receive the first current parameter, the second current parameter, and the voltage parameter. The communication unit is configured to be controlled by the control unit to transmit the first current parameter, the second current parameter, and the voltage parameter to an external monitoring system. The storage unit is configured to store the first current parameter, the second current parameter, the voltage parameter, and structural information of the measurement module, the structural information comprising connection statuses of the first input terminal, the second input terminal, and the output terminal of the measurement module, and an internal structure of the measurement module.

According to one embodiment of the present disclosure, the measurement module further includes a first breaker, a second break or a third breaker. The first breaker is configured to be controlled by the control unit to cut off a current path between the first input terminal and the first current sensor when the measurement module performs a positioning operation. The second breaker is configured to be controlled by the control unit to cut off a current path between the output terminal and the first current sensor when the measurement module performs the positioning operation. The third breaker is configured to be controlled by the control unit to cut off a current path between the second input terminal and the second current sensor when the measurement module performs the positioning operation.

Yet another aspect of the present disclosure provides a positioning method, which is adaptable to a power generation system having AC generation modules. Each of the AC generation modules generates an output current and is electrically connected to each other in a power-supply network. The positioning method includes the following operations: (a) measuring AC currents or node voltages generated by the AC generation modules at different positions in the power-supply network to obtain current parameters or voltage parameters; and (b) determining a sequence of relative positions of the AC generation modules by calculating the current parameters or the voltage parameters.

According to one embodiment of the present disclosure, the positioning method further includes operations: sequentially opening a connection path between one of the AC generation modules and one of the two adjacent AC generation modules to measure a voltage at a position of each of the AC generation modules in the power-supply network to obtain voltage parameters; and determining the sequence of the relative positions of the plurality of AC generation modules by calculating the voltage parameters.

In summary, the technical solution of the present disclosure has obvious advantages and beneficial effects as compared with the prior art. Through the above technical solution, considerable advances in technology and extensive industrial applicability can be achieved. According to the present disclosure, the AC generation modules in the solar energy generation system can be rapidly positioned and working statuses of the AC generation modules can be monitored in a real-time manner.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 2B is a schematic diagram of solar energy generation system in

FIG. 2A according to another embodiment of this disclosure;

DETAILED DESCRIPTION

Figure 1:
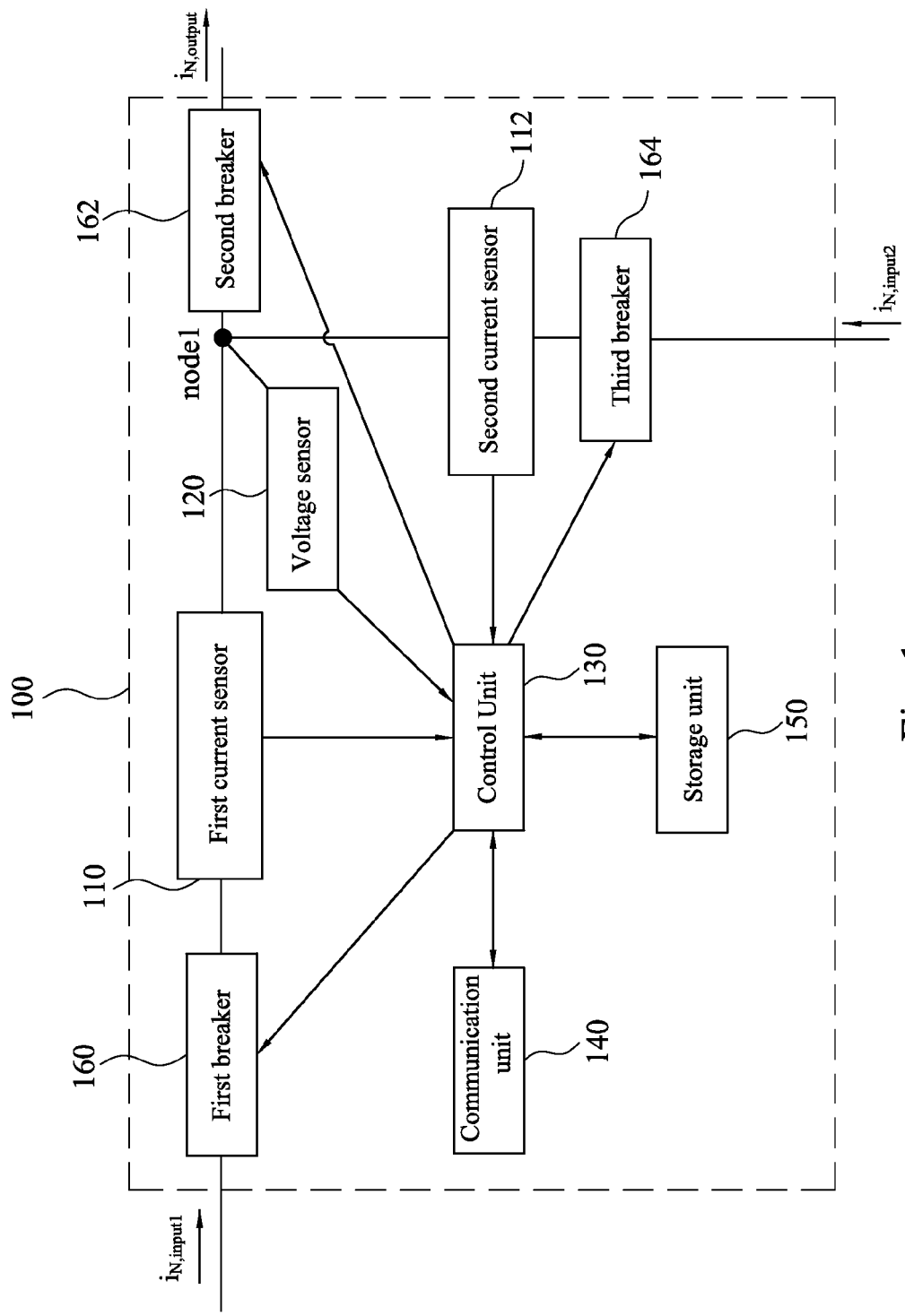
FIG. 1 is a schematic diagram of a measurement module according to one embodiment of this disclosure.

Reference will now be made in detail to the present embodiments of the disclosure, examples of which are illustrated in the accompanying drawings. However, the embodiments provided herein are intended as illustrative only since numerous modifications and variations therein will be apparent to those skilled in the art. Description of the operation does not intend to limit the operation sequence. Any devices resulting from recombination of components with equivalent effects are within the scope of the present disclosure. In addition, drawings are only for the purpose of illustration and not plotted according to the original size. Wherever possible, the same reference numbers are used in the drawings and the description to refer to the same or like parts for easy understanding.

As used herein, "the first", "the second", . . . etc. do not refer to the order or priority, nor are they intended to limit the disclosure. They are merely used to distinguish the devices or operations described with the same technical terms.

As used herein, both "couple" and "connect" refer to direct physical contact or electrical contact or indirect physical contact or electrical contact between two or more components. Or they can also refer to reciprocal operations or actions between two or more components.

Figure 2A:
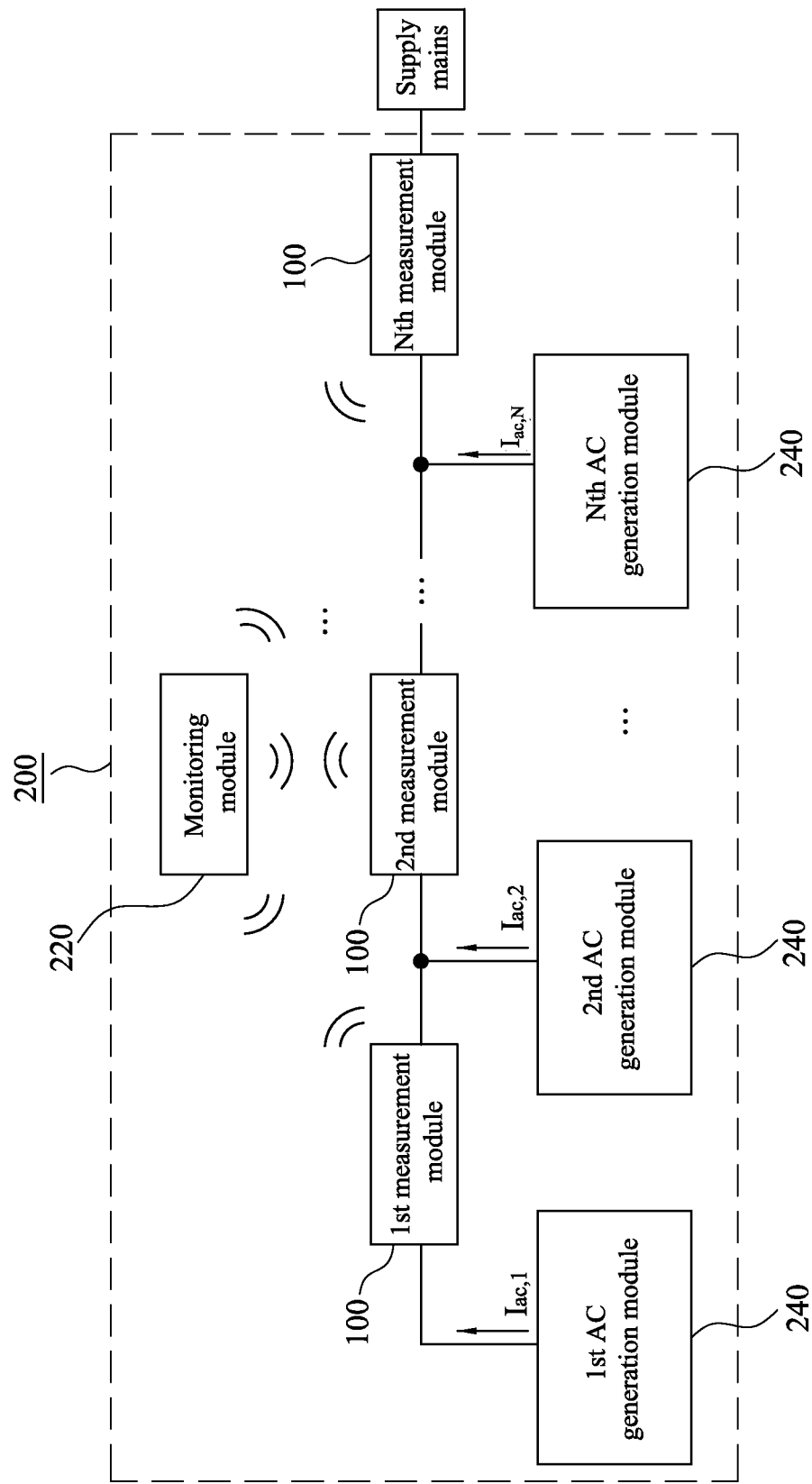
FIG. 2A is a schematic diagram of a solar energy generation system according to one embodiment of this disclosure.

Please referring to both of FIG. 1 and FIG. 2A, FIG. 1 is a schematic diagram of a measurement module 100 according to one embodiment of this disclosure. FIG. 2A is a schematic diagram of a solar energy generation system 200 according to one embodiment of this disclosure. As shown in FIG. 2A, the solar energy generation system 200 includes a monitoring module 220, AC generation modules 240, and measurement modules 100.

The measurement modules 100 are disposed to the AC generation modules 240 correspondingly. In the embodiment shown in FIG. 2A, each of the measurement modules 100 is coupled between two of the AC generation modules 240, or coupled between one of the AC generation modules 240 and a supply mains.

As shown in FIG. 1, the measurement module 100 includes a first current sensor 110 and a communication unit 140.

The measurement module 100 has two input terminals and one output terminal. The first current sensor 110 is coupled between one of the input terminals and the output terminal of the measurement module 100. The first current sensor 110 is configured to generate a first current parameter (i.e., $i_{N,input\ 1}$).

For example, the first current sensor 100 measures a total current $i_{N,input\ 1}$ received at the input terminal of the measurement module 100. The total current $i_{N,input\ 1}$ may be a sum of AC currents output from the AC generation modules 240 previous to a position of the measurement module 100. For example, as shown in FIG. 2A, the total current $i_{2,input\ 1}$ received at the input terminal of the second stage measurement module 100 is a sum of AC currents output from a first stage AC generation module 240 and a second stage AC generation module 240 (i.e., $i_{2,input\ 1} = I_{ac,1} + I_{ac,2}$) and the first current parameter corresponding to the total current $i_{2,input\ 1}$ is generated.

The communication unit 140 is configured to transmit the first current parameter and a voltage parameter to an external monitoring system. For example, the communication unit 140 may transmit the first current parameter and the voltage parameter to the external monitoring system via wireless transmission or wire transmission, such as power line communication (PLC). Thus, users can achieve central control to acquire operating conditions of each of the AC generation modules in a real-time manner through external monitoring.

A number of embodiments applying the measurement module 100 are described in the following paragraphs to illustrate functions and applications of the above measurement module 100. However, the present disclosure is not limited to the following embodiments.

As shown in FIG. 2A, each of the AC generation modules 240 converts solar energies into electrical energies and outputs an output current $I_{ac,N}$. Each of the AC generation modules 240 is electrically connected to the other AC generation modules 240 in a power-supply network. All the output currents $I_{ac,N}$ are collected by the power-supply network and transmitted to power plants or supply mains.

In this embodiment, the measurement modules 100 are respectively connected to the AC generation modules 240. The first current sensor 110 of each of the measurement modules 100 is configured to detect an AC current passing through a position of the each of the measurement modules 100 in the power-supply network, so as to generate the first current parameter correspondingly.

For example, as shown in FIG. 2A, each of the first stage to the (N−1)th stage measurement modules 100 is disposed between the two adjacent AC generation modules 240. Each of the measurement modules 100 includes an input terminal and an output terminal. The input terminal of each of the measurement modules 100 is coupled to a previous stage AC generation module 240. The output terminal of each of the measurement modules 100 is coupled to the next stage AC generation module 240. The Nth stage measurement module 100 is disposed between the AC generation module 240 and the supply mains. The input terminal of the Nth stage measurement module 100 is coupled to the previous stage AC generation module 240, and the output terminal of the Nth stage measurement module 100 is coupled to the supply mains.

With such a configuration, the first current sensor 110 in the each stage measurement module 100 is able to detect a sum of the output currents of the AC generation modules 240 previous to the position of the each stage measurement module 100, so as to generate the first current parameter.

For example, the first current sensor 110 in the first stage measurement module 100 can measure the output current $I_{ac,1}$ generated by the first stage AC generation module 240. The first current sensor 110 in the second stage measurement module 100 can measure the sum of the output current $I_{ac,1}$ generated by the first stage AC generation module 240 and the output current $I_{ac,2}$ generated by the second stage AC generation module 240.

The communication unit 140 in each of the measurement modules 100 transmits the above first current parameters to the monitoring module 220.

The monitoring module 220 then determines a sequence of relative positions of the AC generation modules 240 in the power-supply network by calculating the first current parameters transmitted from the plurality of measurement modules 100.

For example, it is assumed that each of the AC generation modules 240 generates a current of 1 ampere (A) in normal operation, the corresponding first current parameter generated by the first stage measurement module 100 would be 1 A (i.e., the AC current $I_{ac,1}$ output from the first stage AC generation module 240), and the corresponding first current parameter generated by the second stage measurement module 100 would be 2 A (i.e., the sum of the AC current $I_{ac,1}$ output from the first stage AC generation module 240 and the AC current $I_{ac,2}$ output from the second stage AC generation module 240). Since the rest may be deduced by analogy, the first current parameter generated by the Nth stage measurement module 100 is N*1 A.

Hence, by sorting the first current parameters in numerical order, relative positions of the AC generation modules 240 can be determined. As compared with manual recording method in some approaches, solar energy generation system 200 illustrated in this embodiment utilizes the monitoring module 220 to calculate the first current parameters, a rapidly positioning for the AC generation modules 240 is achieved.

Moreover, if the second stage AC generation module 240 is faulty, and a conversion efficiency of the second stage AC generation module 240 is thus reduced. The output current $I_{ac,2}$ of the second stage AC generation module 240 is only 0.3 A and all the others of the AC generation modules 240 function normally to output the current of 1 A. Under the circumstances, the first current parameter generated by the second stage measurement module 100 is 1.3 A, and the first current parameter generated by the third stage measurement module 100 is 2.3 A. Users would be aware of that the second stage AC generation module 240 is faulty when obtaining the above information through the monitoring module 220, so as to perform subsequent maintenance.

According to another embodiment of the present disclosure, each of the measurement modules 100 of the solar energy generation system 200 further includes a voltage sensor 120, a control unit 130, and a first breaker 160 or a second breaker 162.

The first breaker 160 is configured to be controlled by the control unit 130 to cut off a current path between the input terminal of the measurement module 100 and the first current sensor 110. The second breaker 162 is configured to be controlled by the control unit 130 to cut off a current path between the output terminal of the measurement module 100 and the first current sensor 110.

As shown in both FIG. 1 and FIG. 2A, the first breaker 160 is coupled between the input terminal of the measurement module 100 and the first current sensor 110. The second breaker 162 is coupled between the output terminal of the measurement module 100 and a coupling node node1 of the first current sensor 110 and the second current sensor 112.

The voltage sensor 120 is configured to measure a voltage at the output terminal of the measurement module 100 to generate a voltage parameter correspondingly. For example, the voltage sensor 120 in the second stage measurement module 100 shown in FIG. 2A can detect a voltage at the position of the second stage measurement module 100 in the power-supply network (i.e., the voltage at the internal node node1 of the measurement module 100), so as to generate the corresponding voltage parameter.

The control unit 130 is configured to receive the above-mentioned first current parameter, a second current parameter, and the above-mentioned voltage parameter, and transmit these parameters to the communication unit 140 and a storage unit 150. The control unit 130 is configured to be controlled by the monitoring module 220 to open the first breaker 160 or a second breaker 162.

In this embodiment, the monitoring module 220 sequentially opens the first breaker 160 or the second breaker 162 in each of the measurement modules 100 by controlling the control unit 130, and determines the sequence of the relative positions of the AC generation modules 240 by calculating the voltage parameters transmitted from the measurement modules 100.

For example, when the second breaker 162 of the (N−1)th stage measurement module 100 is opened, in other words, when the connection between the first stage AC generation module 240 to the (N−1)th stage AC generation module 240 and the power-supply network is cut off, the voltage sensor 120 in each of the first stage measurement module 100 to the (N−1)th stage measurement module 100 detect a voltage change in the power-supply network. Similarly, when the second breaker 162 of the second stage measurement module 100 is opened, in other words, when the connection between the first stage AC generation module 240 to the second stage AC generation modules 240 and the power-supply network is cut off, the voltage sensor 120 in each of the first stage measurement module 100 to the second stage measurement modules 100 detect the voltage change in the power-supply network. In this manner, when one of the measurement modules 100 is cut off, a number of the voltage sensors 120 sensing the voltage change are greater, the sort of the position of the corresponding measurement module 100 is farther back in the power-supply network. That is, more closed to a responsibility transfer point (such as the Nth stage measurement module 100). Conversely, number of the voltage sensor(s) 120 sensing the voltage change is lower, the sort of the position of the corresponding measurement modules 100 is at the front of the power-supply network.

Hence, the monitoring module 220 can sequentially opens the first breaker 160 or the second breaker 162 in each of the measurement modules 100 to observe a number of the voltage parameters being affected. As a result, each of the AC generation modules 240 is positioned. Power companies can access the above-mentioned first breakers 160 or second breakers 162 by remote control via an external monitoring system. By cutting off the first breakers 160 or the second breakers 162 in sequence, power companies are allowed to perform different testing at each of the terminals without performing the complex testing steps one by one on site as required by some approaches.

Each of the measurement modules 100 is not limited to including the first breaker 160 and the second breaker 162 at the same time. In practical applications, the above-mentioned functions can be achieved by disposing any one of the breakers (the first breakers 160 or the second breakers 162) in each of the measurement modules 100.

Figure 2B:
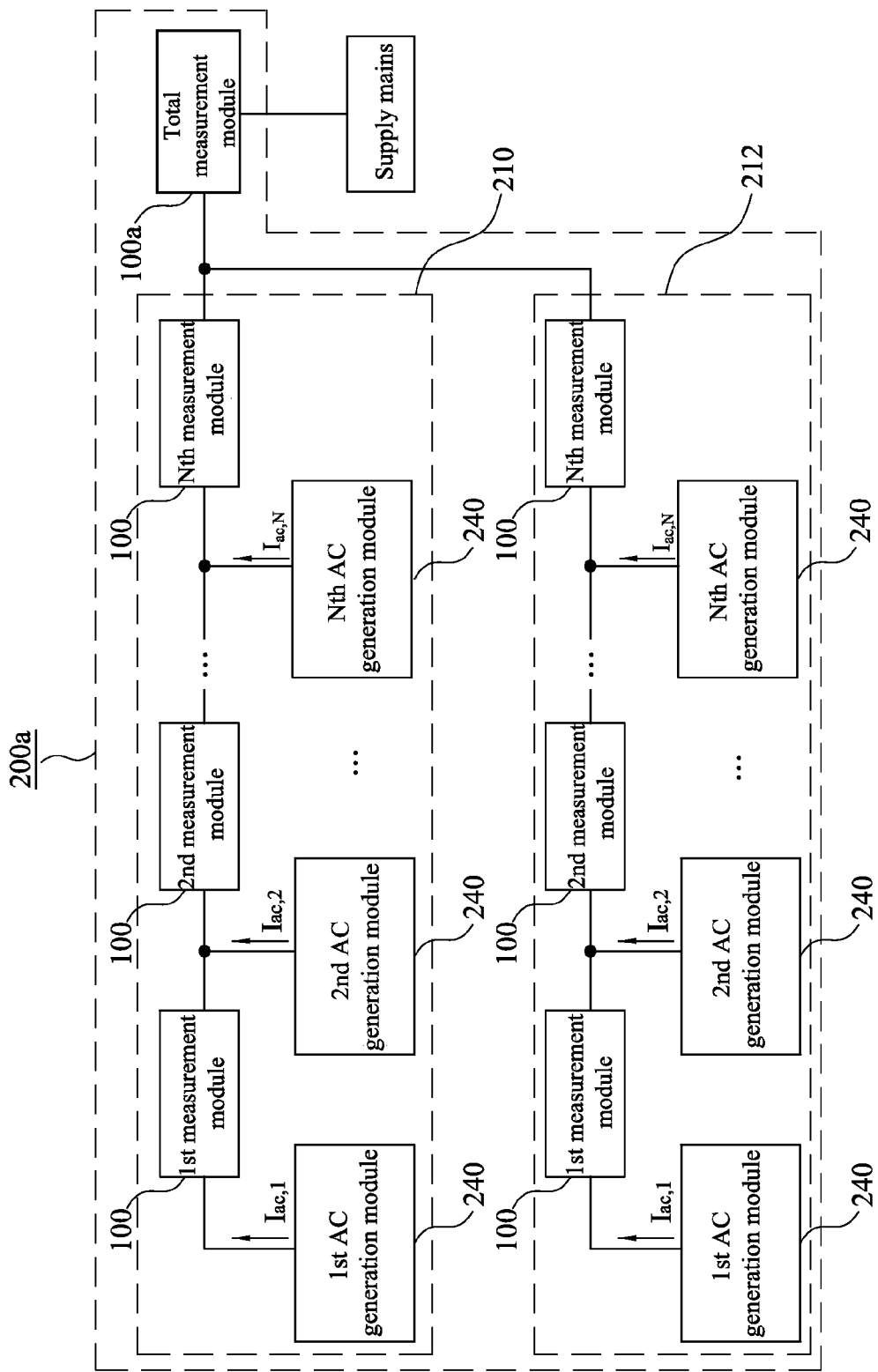

FIG. 2B is a schematic diagram of solar energy generation system in FIG. 2A according to another embodiment of this disclosure.

As shown in FIG. 2B, the solar energy generation system 200a has two sub power generation systems 210 and 212. Each of the sub power generation systems 210 and 212 includes the AC generation modules 240 and the measurement modules 100.

In this embodiment, each of the sub power generation systems 210 and 212 has the same number of the AC generation modules 240, and it is assumed that each of the measurement modules 100 does not have the above-mentioned first breaker 160 and the second breaker 162. Under the circumstances, the monitoring module 220 is not able to identify positions of the sub power generation system 210 and the sub power generation system 212. Hence, operation of any of the AC generation modules 240 can be stopped by shading the sub power generation system 210 or the sub power generation system 212, so as to differentiate total currents of the two sub power generation systems 210 and 212. Thus, the monitoring module 220 is allowed to identify the sub power generation system 210 and the sub power generation system 212. After the sub power generation system 210 and the sub power generation system 212 are identified by the monitoring module 220, the above-mentioned operations for positioning are performed to the sub power generation system 210 and the sub power generation system 212, so as to allow the monitoring module 220 to determine the sequences of the relative positions of the AC generation modules 240 in both the sub power generation system 210 and the sub power generation system 212.

For example, if each of the sub power generation systems 210 and 212 has N stages of the AC generation modules 240, and each of the AC generation modules 240 generates the current of 1 ampere (A) in normal operation. Theoretically, the first current parameter generated by a total measurement module 100a shown in FIG. 2B would be (2N)*1 A. If the first stage AC generation module 240 in the sub power generation system 212 is stopped to operate by, for example, manually shading so that the first stage AC generation modules 240 cannot receive solar energies as normal, the first current parameter generated by the total measurement module 100a thus becomes (2N−1)*1 A. The first current parameter generated by the Nth stage measurement module 100 in the sub power generation system 212 should be (N−1)*1 A. The first current parameter generated by the Nth stage measurement module 100 in the sub power generation system 210 should be (N)*1 A. In this manner, the monitoring module 220 is able to position the sub power generation system 210 and the sub power generation system 212, and arranges the relative positions of the AC generation modules 240 in both the sub power generation system 210 and the sub power generation system 212 in sequence by sorting the above-mentioned first current parameters in numerical order.

Figure 3A:
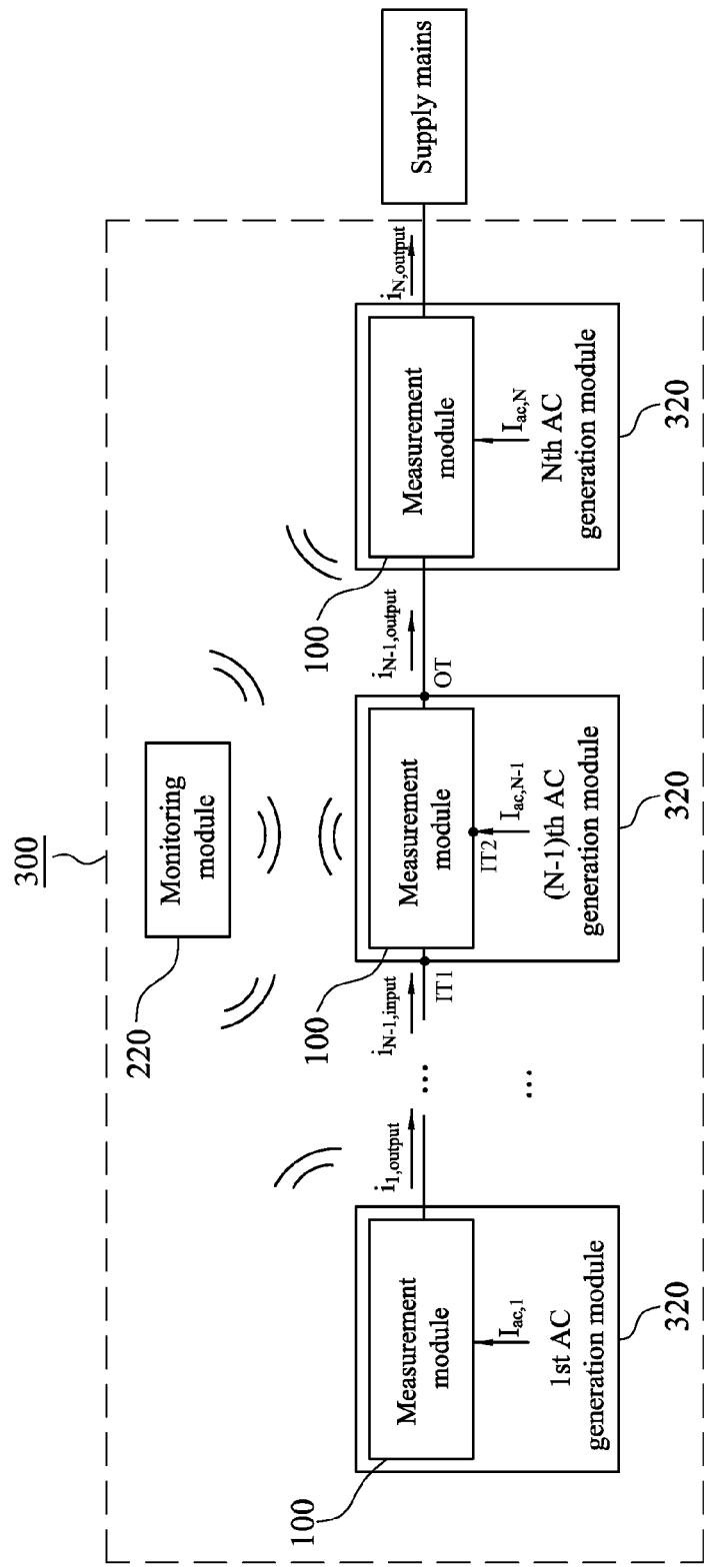
FIG. 3A is a schematic diagram of solar energy generation system according to another embodiment of this disclosure.

FIG. 3A is a schematic diagram of solar energy generation system according to another embodiment of this disclosure.

As shown in FIG. 3A, in a solar energy generation system 300, each of the measurement modules 100 is disposed in a current stage AC generation module 320 correspondingly, and is coupled between the two adjacent AC generation modules 320 via the power-supply network. According to the present embodiment, each of the measurement modules 100 can directly measure an AC current $I_{ac,N}$ generated by a single stage AC generation module 320, and measure a sum of AC currents generated by all the previous stage AC generation modules 320 at the same time. Specifically, a first input terminal IT1 of the measurement module 100 in the current stage AC generation module 320 is coupled to the previous stage AC generation module 320, a second input terminal IT2 of the measurement module 100 in the current stage AC generation module 320 is configured to receive the AC current of the current stage AC generation module 320, and an output terminal OT of the measurement module 100 in the current stage AC generation module 320 is couple to the next stage AC generation module 320.

As shown in both FIG. 1 and FIG. 3A, the measurement module 100 may further include a second current sensor 112 coupled between the other one of the input terminals and the output terminal of the measurement module 100 in this embodiment. The second current sensor 112 is configured to generate the second current parameter (i.e., is $i_{N,input2}$). The second current sensor 112 may be configured to detect the AC current output by a single AC generation module (the current stage AC generation module 320) and generates the second current parameter $i_{N,input2}$ correspondingly. Alternatively, a total current output from sub power generation systems connected in parallel may be obtained through the second current sensor 112, when the power-supply network includes the sub power generation systems connected in parallel.

In the present embodiment, the measurement module 100 may be correspondingly disposed in the current stage AC generation module 320 using different methods. A number of realizing methods are described in the following paragraphs, but the present disclosure is not limited to the following methods.

Figure 3B:
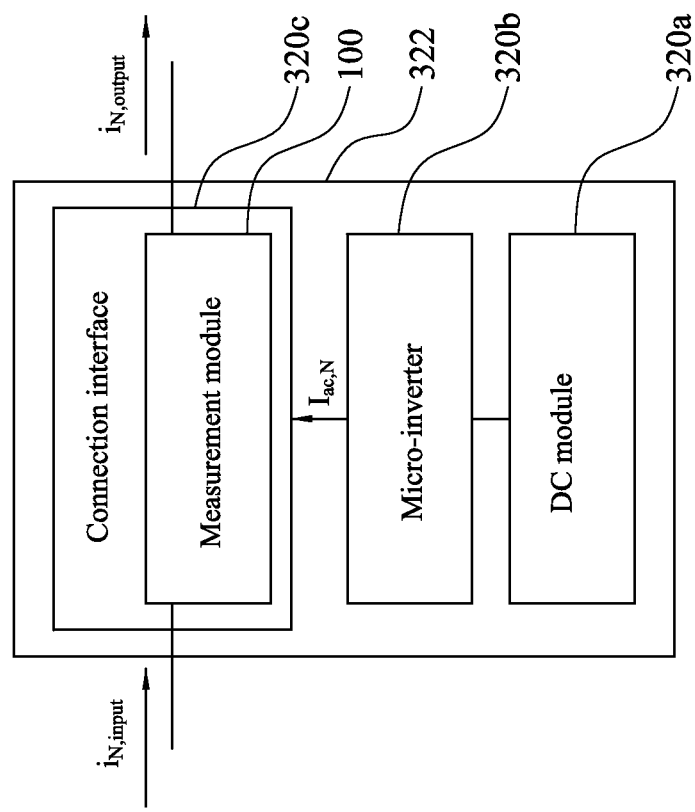
FIG. 3B is a schematic diagram of a measurement module according to another embodiment of this disclosure.

FIG. 3B is a schematic diagram of a measurement module according to another embodiment of this disclosure.

Typically, the AC generation module 320 includes a DC module 320a, a micro-inverter 320b, and a connection interface 320c. The DC module 320a converts solar energies into electrical energies. The micro-inverter 320b converts the electrical energies (DC) to AC output the AC current $I_{ac,N}$. The connection interface 320c connects the each stage AC generation module 320 via a modular power line socket.

In the present embodiment, the measurement module 100 may be integrated into the above-mentioned connection interface 320c (such as the AC generation module 322) to reduce the size and cost of the AC generation module. Layout of the power circuit is thus more flexible. The connection interface 320c may be any interface device being able to integrate or accommodate the above measurement module 100 within it, such as a connector.

Figure 3C:
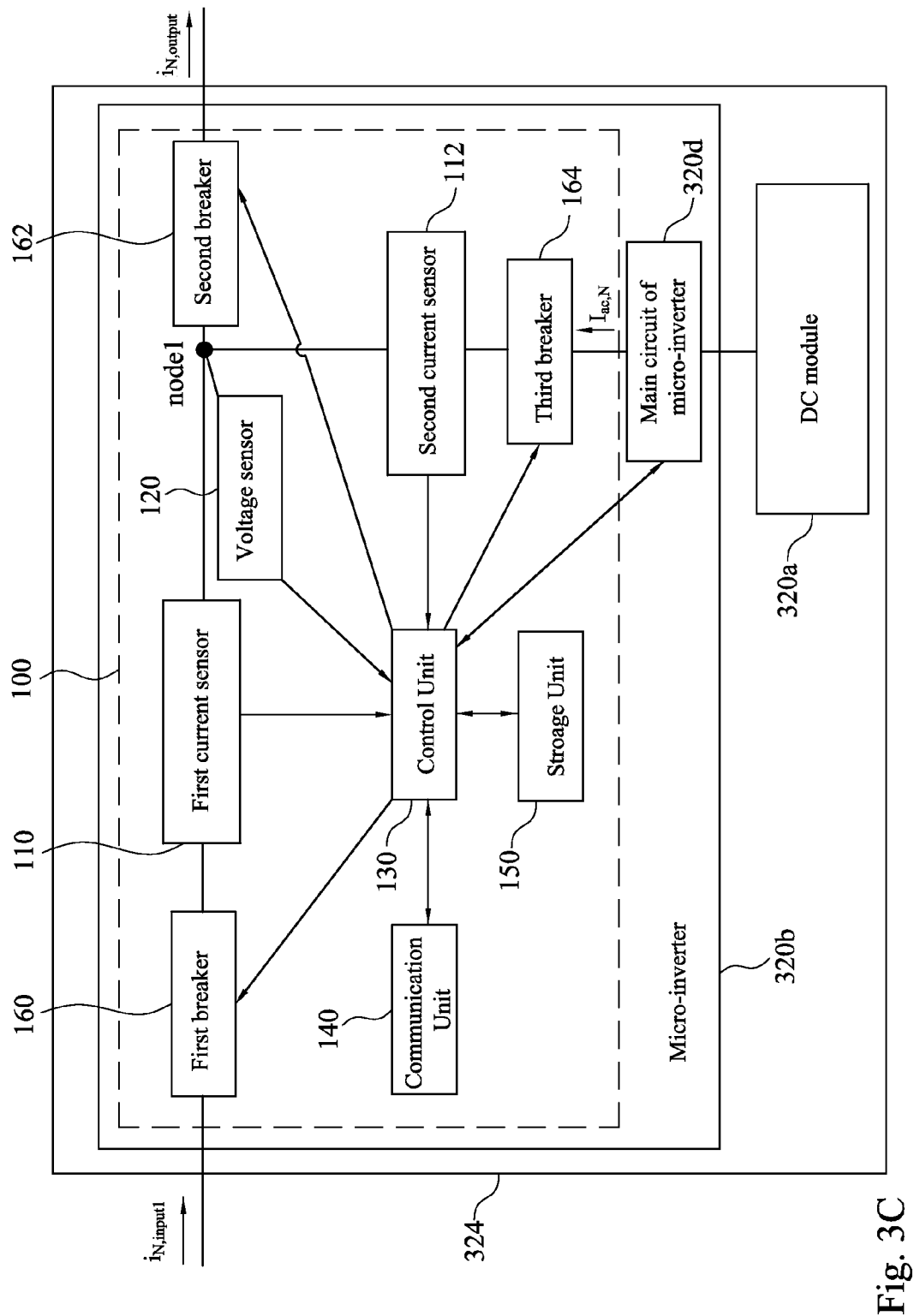
FIG. 3C is a schematic diagram of a measurement module according to yet another embodiment of this disclosure.

FIG. 3C is a schematic diagram of a measurement module according to yet another embodiment of this disclosure.

In this embodiment, when the micro-inverter 320b includes a current sensor for itself to monitor the AC current $I_{ac,N}$ being converted by the micro-inverter 320b, the measurement module 100 and the micro-inverter 320b may be further integrated. For example, the current sensor of the micro-inverter 320b can be shared with the measurement module 100 (i.e., the AC generation module 324). That is, the measurement module 100 and the micro-inverter 320b share the second current sensor 112 to highly integrate the system and save additional hardware cost. However, the present disclosure is not limited thereto. In addition, a main circuit of the micro-inverter 320d is configured to convert the DC current generated by the DC module 320b to the AC current $I_{ac,N}$.

Oh the other hand, as shown in FIG. 3A, each of the measurement modules 100 in the solar energy generation system 300 includes a first input terminal, a second input terminal, and an output terminal. The first input terminal of the measurement module 100 is coupled to the previous stage AC generation module 320. The second input terminal of the measurement module 100 is coupled to the current stage AC generation module 320. The output terminal of the measurement module 100 is coupled to the next stage AC generation module 320.

For example, the first input terminal of the measurement module 100 in the (N−1)th stage AC generation module 320 shown in FIG. 3A is coupled to the (N−2)th stage AC generation module 320 and receives the AC current $i_{N-1,input}$ (i.e., a sum of the AC currents output from the first stage AC generation module 320 to the (N−2)th stage AC generation module 320, that is, $i_{N-1,input}=I_{ac,1}+I_{ac,2}+\ldots+I_{ac,N-2}$). The second input terminal of the measurement module 100 in the (N−1)th stage AC generation module 320 receives the AC current $I_{ac,N-1}$ output by the (N−1)th stage AC generation module 320 itself. The output terminal of the measurement module 100 in the (N−1)th stage AC generation module 320 is coupled to the Nth stage AC generation module 320 to transmit the AC current $i_{N-1,output}$, and $i_{N-1,output}=i_{N-1,output}+I_{ac,N-1}$, that is, the AC current $i_{N-1,output}$ is a sum of the AC currents output from the first stage AC generation module 320 to the (N−1)th stage AC generation module 320.

With additional reference to FIG. 1, the second current sensor 112 of the measurement module 100 is coupled between the second input terminal and the output terminal of the measurement module 100 in this embodiment.

In this embodiment, the communication unit 140 in the measurement module 100 transmits the above-mentioned second current parameters to the monitoring module 200.

The monitoring module 220 determines working statuses of the AC generation modules 320 based on the second current parameters transmitted from the measurement modules 100.

For example, it is assumed that each of the AC generation modules 320 will output the AC current $I_{ac,N}$ of 100 mA in normal operation. If the first stage AC generation module 320 is faulty, the AC current $I_{ac,1}$ output by the first stage AC generation module 320 is thus reduced to 30 mA. Under the circumstances, the monitoring module 220 is able to determine that the working status of the first stage AC generation module 320 is abnormal based on the second current parameter transmitted from the measurement module 100 in the first stage AC generation module 320.

In addition, the monitoring module 220 in the solar energy generation system 300 can determine relative positions of the AC generation modules 320 in sequence based on the first current parameter transmitted from each of the measurement modules 100.

As shown in both FIG. 1 and FIG. 3A, in still another embodiment, each of the measurement modules 100 in the solar energy generation system 300 may further includes a third breaker 164.

The third breaker 164 is configured to be controlled by the control unit 130 to cut off a current path between the second input terminal of the measurement module 100 and the second current sensor 112.

In the present embodiment, the control unit 130 is controlled by the monitoring module 220 to open the third breaker 164. The monitoring module 220 sequentially opens the third breaker 164 in each of the measurement modules 100 by controlling the control unit 130, and determines a sequence of the relative positions of the AC generation modules 320 by calculating the first current parameter transmitted from each of the measurement modules 100.

For example, when the third breaker 164 of the first stage AC generation module 320 is cut off, the first current parameters measured by the second stage AC generation module 320 to the Nth stage AC generation module 320, following to the first stage AC generation module 320, (i.e., $i_{2,input}\sim i_{N,input}$) change correspondingly. Similarly, when the third breaker 164 of the N−2th stage AC generation module 320 is cut off, the first current parameters measured by the (N−1)th stage AC generation module 320 to the Nth stage AC generation module 320, following to the (N−2)th stage AC generation module 320, (i.e. $i_{N-1,input}\sim i_{N,input}$) are changed correspondingly, but the first current parameters measured by the first current sensors 110 in the first stage AC generation module 320 to the N−2th stage AC generation module 320 (i.e. $i_{1,input}\sim i_{N-2,input}$) are not changed.

Hence, in the present embodiment, the monitoring module 220 can sequentially open each of the AC generation modules 320 and record the first current parameter transmitted from each of the measurement modules 100 at the same time. By observing a change of each of the first current parameters, the sequence of the relative positions of the AC generation modules 320 in the power-supply network is determined. Alternatively, each of the measurement modules 100 in the solar energy generation system 300 may have the above-mentioned first breaker 160 or second breaker 162 and the voltage sensor 120 according to the present disclosure. With such a configuration, the monitoring module 200 is able to position the AC generation modules 320 through measuring the voltage parameters.

In the above embodiments, the measurement module 100 may further include a storage unit 150. With reference to FIG. 1, the storage unit 150 is configured to store the above-mentioned first current parameter, second current parameter, voltage parameter, and structural information of the measurement module 100. The structural information of the measurement module 100 may include connection statuses of the input terminals and the output terminal of the measurement module 100 and internal structure of the measurement module 100.

With such a configuration, power companies are allowed to access information in the storage unit 150 by utilizing the external monitoring system (that is the monitoring module 220) through the communication unit 140 so as to obtain the structure of the measurement module 100 currently applied to the electric power system. As a result, operations as required by different situations can be performed correspondingly. In addition, the monitoring module 220 may be integrated into the measurement module 100 to achieve a higher integration degree in the above embodiments.

Figure 4:
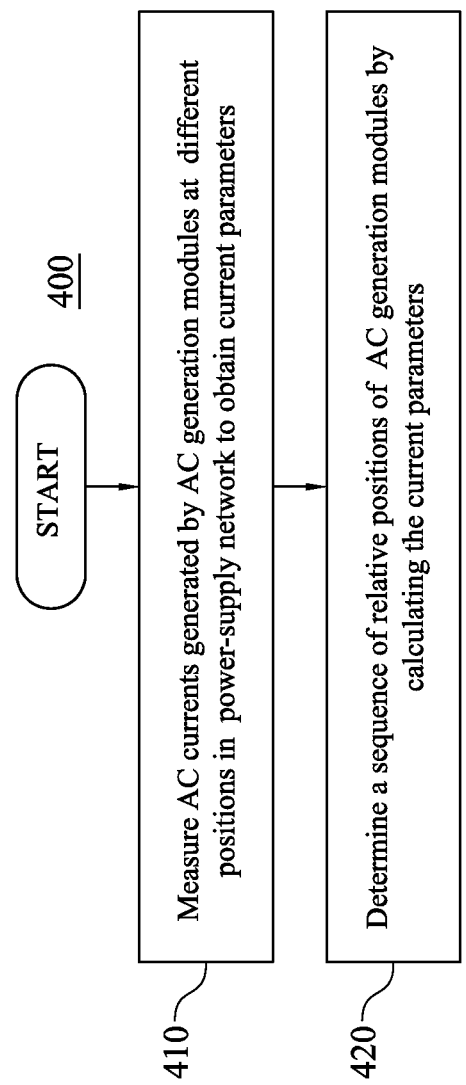
FIG. 4 is a flow chart of a positioning method according to one embodiment of this disclosure.

FIG. 4 is a flow chart of a positioning method according to one embodiment of this disclosure.

Another aspect of the present disclosure provides a positioning method 400. The positioning method 400 may be applied to a power system having a plurality of AC generation modules. Each of the AC generation modules generates an output current, and each of the AC generation modules is electrically connected to the other AC generation modules in the power-supply network.

In operation 410, node voltages and AC currents generated from the AC generation modules at different positions in the power-supply network are measured to obtain a plurality of voltage parameters and current parameters. In this operation, based on structural information of measurement modules, the measurements may be directly performed or performed after breakers are controlled. Alternatively, if it is temporarily unable to judge, manual shading is required to complete the measurements. In operation 420, a sequence of relative positions of the AC generation modules are determined by calculating the plurality of current parameters. When facing the conduction that is temporarily unable to judge, the measurements are performed with the assistance of manual shading, and the positioning method 400 may be performed by performing operations 410 and 420 alternately.

For example, as shown in FIG. 2A, the measurement modules 100 measure currents at the different positions in the power-supply network and generate the current parameters correspondingly (such as the above-mentioned first current parameters). The sequence of the relative positions of the AC generation modules 240 can be determined by sorting the current parameters in numerical order.

Alternatively, in operation 410, the output current generated by each of the AC generation modules is cut off sequentially, and the AC currents of the AC generation modules at the different positions in the power-supply network are measured to obtain the current parameters.

For example, when the output current of the N−1 th stage AC generation module 320 $I_{ac,N-1}$ is cut off, the first current parameter measured by the Nth stage AC generation module 320 at the farthest back (i.e., $i_{N,input}$) is changed correspondingly, but the first current parameters measured by the first stage AC generation module 320 to the N−1th stage AC generation module 320 (i.e., $i_{1,input}$~$i_{N-1,input}$) are not changed, as shown in FIG. 3A. In this manner, the sequence of the relative positions of the AC generation modules 320 can be determined.

In the positioning method 400, a voltage at a position of each of the AC generation modules in the power-supply network can be measured by sequentially opening a connection path between the each of the AC generation modules and one of the two adjacent AC generation modules to obtain the voltage parameters. In this manner, the sequence of the relative positions of the AC generation modules can also be determined by calculating the voltage parameters.

For example, as shown in FIG. 2A, each of the first stage measurement module 100 to the (N−1)th stage measurement module 100, previous to the Nth stage AC generation module 240, sense a voltage change, when a connection between the Nth stage AC generation module 240 and the (N−1)th stage AC generation module 240 is cut off. In this manner, the sequence of the relative positions of the AC generation modules 240 can be determined based on a number of the voltage parameters that have been changed.

The single-phase solar energy generation system in the above embodiments is shown by way of example. However, the present disclosure is not limited in this regard, and those of ordinary skill in the art may dispose various types of power generation systems based on the above embodiments, such as a three-phase power generation system.

In summary, the measurement module of the present disclosure has a number of applications. The measurement module may include all the current sensors, the voltage sensor, and the breakers to fulfill different requirements. Alternatively, the measurement module may only include a single current sensor and a breaker, or various combinations of the above devices in consideration of cost. Users may acquire structural information regarding which combination is in the measurement module applied to the power circuit by accessing the storage unit of the measurement module so as to perform different positioning and monitoring operations.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A solar energy generation system, comprising:
a monitoring module;
a plurality of AC generation modules, each of the AC generation modules generating an output current; and
a plurality of measurement modules electrically connected to each other in series in a power-supply network, the measurement modules being electrically con- nected to the AC generation modules respectively, each of the measurement modules comprising:
- a first current sensor configured to detect an AC current passing through a position of each of the measurement modules at the power-supply network to generate a first current parameter; and
- a communication unit configured to transmit the first current parameter to the monitoring module;
- wherein the monitoring module is configured to determine a sequence of relative positions of the AC generation modules by calculating the first current parameters transmitted from the measurement modules.

2. The solar energy generation system of claim 1, wherein each of the measurement modules is disposed between two adjacent AC generation modules, each of the measurement modules comprises a first input terminal and an output terminal, the first input terminal is coupled to a previous stage AC generation module, and the output terminal is coupled to a next stage AC generation module or to a supply mains.

3. The solar energy generation system of claim 2, wherein the first current sensor is coupled between the first input terminal and the output terminal for detecting a sum of the AC currents generated by the previous stages of AC generation modules to generate the first current parameter.

4. The solar energy generation system of claim 2, wherein each of the measurement modules comprises a first breaker coupled between the first input terminal and the first current sensor.

5. The solar energy generation system of claim 4, wherein each of the measurement modules comprises a second breaker coupled between the output terminal and the first current sensor.

6. The solar energy generation system of claim 5, wherein each of the measurement modules further comprises:
- a voltage sensor configured to detect a voltage at the position of each of the measurement modules in the power-supply network to generate a voltage parameter; and
- a control unit configured to be controlled by the monitoring module to open the first breaker and the second breaker;
- wherein the monitoring module sequentially opens the first breaker of each of the measurement modules by controlling the control unit, and determines the sequence of the relative positions of the AC generation modules by calculating the voltage parameters transmitted from the measurement modules.

7. The solar energy generation system of claim 5, wherein each of the measurement modules further comprises:
- a voltage sensor configured to detect a voltage at the position of each of the measurement modules in the power-supply network to generate a voltage parameter; and
- a control unit configured to be controlled by the monitoring module to open the first breaker and the second breaker;
- wherein the monitoring module sequentially opens the second breaker of each of the measurement modules by controlling the control unit, and determines the sequence of the relative positions of the AC generation modules by calculating the voltage parameters transmitted from the measurement modules.

8. The solar energy generation system of claim 1, wherein each of the measurement modules is disposed in a current stage AC generation module and is coupled between a previous stage AC generation module and a next stage AC generation module or between the AC generation module and a supply mains via the power-supply network, each of the measurement modules comprises a first input terminal, a second input terminal, and an output terminal, the first input terminal is coupled to the previous stage AC generation module, the second input terminal is configured to receive an AC current of the current stage AC generation module, and the output terminal is coupled to the next stage AC generation module.

9. The solar energy generation system of claim 8, wherein each of the measurement modules further comprises:
- a second current sensor coupled between the second input terminal and the output terminal for detecting the output current generated by the current stage AC generation module to generate a second current parameter, the communication unit further transmits the second current parameter to the monitoring module, the monitoring module is configured to determine working statuses of the AC generation modules based on the second current parameters transmitted from the measurement modules.

10. The solar energy generation system of claim 8, wherein the first current sensor is coupled between the first input terminal and the output terminal for detecting a sum of the output currents generated by the stages of the AC generation modules previous to the position of the current stage measurement module to generate the first current parameter.

11. The solar energy generation system of claim 9, wherein each of the measurement modules comprises a first breaker coupled between the first input terminal and the first current sensor, a second breaker coupled between the output terminal and the first current sensor, and a third breaker coupled between the second input terminal and the second current sensor.

12. The solar energy generation system of claim 11, wherein each of the measurement modules further comprises:
- a voltage sensor configured to detect a voltage at the position of each of the measurement modules in the power-supply network to generate a voltage parameter; and
- a control unit configured to be controlled by the monitoring module to open the first breaker, the second breaker and the third breaker.

13. The solar energy generation system of claim 12, wherein the monitoring module sequentially opens the first breaker of each of the measurement modules by controlling the control unit, and determines the sequence of the relative positions of the AC generation modules by calculating the voltage parameters transmitted from the measurement modules.

14. The solar energy generation system of claim 12, wherein the monitoring module sequentially opens the second breaker of each of the measurement modules by controlling the control unit, and determines the sequence of the relative positions of the AC generation modules by calculating the voltage parameters transmitted from the measurement modules.

15. The solar energy generation system of claim 12, wherein the monitoring module sequentially opens the third breaker of each of the measurement modules by controlling the control unit, and determines the sequence of the relative positions of the AC generation modules by calculating the first current parameters transmitted from the measurement modules.

* * * * *